(12) United States Patent
Requejo et al.

(10) Patent No.: US 7,683,765 B2
(45) Date of Patent: Mar. 23, 2010

(54) TACTILE SIGNALING

(75) Inventors: Julian Requejo, Aachen (DE); Achim Seibertz, Aachen (DE); Markus Kees, Grevenbroich (DE); Jan Pieter Maurice, Kerkrade (NL)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 11/291,193

(22) Filed: Dec. 1, 2005

(65) Prior Publication Data

US 2006/0119474 A1    Jun. 8, 2006

(30) Foreign Application Priority Data

Dec. 2, 2004    (DE) .................. 10 2004 000 060

(51) Int. Cl.
*B60Q 1/00*    (2006.01)

(52) U.S. Cl. ............... 340/438; 340/407.1; 340/426.31; 701/29; 701/41; 701/42; 180/404

(58) Field of Classification Search ............... 340/438, 340/407.1, 426.31, 825.19, 691.1; 701/1, 701/29, 31, 34, 36, 39, 41, 42, 43; 180/204, 180/6.2, 6.28, 6.6, 12, 400, 404; 307/9.1, 307/10.1
See application file for complete search history.

(56) References Cited

U.S. PATENT DOCUMENTS

| | | | | |
|---|---|---|---|---|
| 3,730,288 A | * | 5/1973 | Dean ........................ | 180/406 |
| 4,031,363 A | * | 6/1977 | Freeman et al. ............... | 701/35 |
| 4,349,823 A | * | 9/1982 | Tagami et al. .................. | 342/70 |
| 6,362,729 B1 | * | 3/2002 | Hellmann et al. ........... | 340/436 |
| 6,438,463 B1 | * | 8/2002 | Tobaru et al. .................. | 701/1 |
| 6,559,764 B1 | * | 5/2003 | Neuner et al. ............... | 340/438 |
| 6,630,891 B1 | * | 10/2003 | Dilling ...................... | 340/902 |
| 7,002,454 B1 | | 2/2006 | Gustafson .................... | 340/441 |
| 7,019,653 B2 | * | 3/2006 | Benedict ..................... | 340/576 |
| 7,228,212 B2 | * | 6/2007 | Hijikata et al. ................ | 701/45 |
| 2002/0079155 A1 | * | 6/2002 | Andonian et al. ........... | 180/402 |
| 2002/0120371 A1 | * | 8/2002 | Leivian et al. ................. | 701/1 |
| 2002/0145512 A1 | * | 10/2002 | Sleichter et al. .......... | 340/407.1 |
| 2004/0183663 A1 | * | 9/2004 | Shimakage ................ | 340/436 |

FOREIGN PATENT DOCUMENTS

DE    697 07 685 T2    8/2002

* cited by examiner

*Primary Examiner*—Toan N Pham
*Assistant Examiner*—Kerri McNally
(74) *Attorney, Agent, or Firm*—Angela M. Brunetti; Fredrick Owens

(57) ABSTRACT

The invention relates to a system for a motor vehicle having a monitoring unit which monitors a fault-free functionality of at least one operator control unit of the motor vehicle and generates warning signals in the case of limit-value functions of the at least one operator control unit. The monitoring unit generates tactile signals as warning signals so that degradation of performance of the at least one operator control unit can be communicated haptically to a driver of the motor vehicle.

4 Claims, 1 Drawing Sheet

TACTILE SIGNALING

CROSS REFERENCE TO RELATED APPLICATIONS

The invention described and claimed herein is described in DE 102 004 000060.3 filed Dec. 2, 2004, whose subject matter is incorporated herein by reference and provides the basis for a claim of priority of invention under 35 U.S.C. 119.

The invention relates to a motor vehicle having a monitoring unit which monitors fault-free functionality of at least one operator control unit of the motor vehicle and generates warning signals in the case of limit-value functions of the at least one operator control unit.

BACKGROUND

Conventional motor vehicles are equipped with a power steering system, a so-called power assisted steering system, in order to reduce the steering effort for the driver. On the one hand, the power assisted steering system is used to facilitate handling in town traffic at low speeds of the motor vehicle, while, on the other hand, a direct steering sensation for the driver is made available at high speeds of the motor vehicle. Most motor vehicles use a hydraulic power assisted steering system (HPAS) for this purpose. However, electric power assisted steering systems (EPAS) are also known. Instead of a hydraulic fluid, they use an electric motor and a gear mechanism to make the power assistance available to the steering system. But so-called steer-by-wire systems in which the vehicle tires are decoupled mechanically from the steering wheel are also under development. These systems have an additional electric motor for generating feedback to the driver.

EP 1 183 176 B1 relates to a steering device for a motor vehicle which is configured to understeer, with steerable front wheels, with a steering element which can be activated by a driver counter to the effect of a steering force or of a steering torque, and with at least one actuator for the lock angle of the steerable wheels, which actuator acts on the steerable wheels and can be influenced by an electronic control device. A device is provided for determining a lateral slip occurring at the steerable wheels. An upper limiting value for the transverse slip can be determined in the electronic control device, with a means being provided which serves to counteract a further increase in the lock angle if the lateral slip which is determined is greater than the upper limiting value.

However, EP 1 183 176 B1 also relates to a steering method for the steering device. The steering element actuator makes the steering element vibrate if the lateral slip which is determined is greater than the upper limiting value. The steering method disclosed in EP 1 183 176 B1 is intended to be suitable in particular for steer-by-wire systems. However, it should also be capable of being used in power-assisted hydraulic or electric steering systems with a rigid mechanical connection between the steering element and steerable wheels.

DE 100 41 178 A1 relates to an operator control device for controlling a motor vehicle having an operator control element which can be moved in a number of degrees of freedom. The operator control element gives tactile feedback, and tactile feedback can be generated in all the degrees of freedom of activation by means of corresponding actuators for signaling in a perceptible way when borderline situations of the vehicle are reached or are imminent.

EP 0 856 453 A2 discloses an electrohydraulic steering system for vehicles which comprises a manual steering system and an automatic steering system (autopilot) which can be activated by means of a switch. The electrohydraulic steering system is composed of at least one hydraulic steering cylinder for adjusting the steerable wheels, at least one sensor for determining the respective wheel lock angle actual values, at least one hydraulic control valve which can be activated electrically and which controls the application of hydraulic fluid to the steering cylinder, at least one automatic steering signal transmitter for generating electric steering signal set point values for the wheel lock angles, an electronic open-loop control line devaluation device, with in each case the automatically generated steering signal set point values and the wheel lock angle actual values being fed to the open-loop control and evaluation device and with the open-loop control and evaluation device determining in each case an electrical activation signal for the hydraulic control valve, using the wheel lock angle actual value and the automatically generated steering signal set point value. A steering signal transmitter which generates from a manual actuating movement an electric steering signal set point value which corresponds to said movement is provided for the manual steering, with this steering signal set point value being supplied to an open-loop control and evaluation device which also receives the respective wheel lock angle actual values. The open-loop control and evaluation device determines an electrical activation signal for the hydraulic control valve, using the wheel lock angle actual value and the manually generated steering signal set point value.

U.S. Pat. No. 6,370,460 B1 discloses a steer-by-wire control system comprising a vehicle tire unit which responds to vehicle tire control signals for controlling the vehicle, a steering wheel unit which responds to steering torque control signals, a vehicle speed sensor for generating a vehicle speed signal, and a main control unit which is of electrical design and is connected to the vehicle speed sensor, the steering wheel unit and the vehicle tire unit. The vehicle tire unit also has a vehicle tire position sensor and a track rod sensor in order to generate and transmit a track rod force signal. In addition, the steering wheel unit has a steering wheel position sensor in order to generate and transmit a steering wheel position signal, and a force sensor in order to generate and transmit a feedback torque signal.

The U.S. Pat No. 6,370,460 B1 system main control unit has a position control unit which calculates the vehicle tire control signal in comparison with the speed signal, the feedback torque signal and the steering wheel position signal. Furthermore, the main control unit generates an opposed track rod force signal. In addition, the main control unit has a force control unit which calculates and generates the steering wheel force control signal in comparison with the opposed track rod force signal, the feedback torque signal, the steering wheel position signal and the speed signal.

U.S. Pat. No. 6,535,806 B2 also discloses a steer-by-wire system. It comprises a steering wheel, a steering wheel sensor which is arranged in relation to the steering wheel in order to both determine its position and to generate an indicating signal for the position of the steering wheel. The system also has a feedback control unit in order to make available an indicating signal for a current direction of the vehicle. A control unit is connected to the steering wheel sensor of the feedback control unit in order to receive the indicating signal for the position of the steering wheel from the steering wheel sensor and receive the indicating signal for the current direction of the vehicle from the feedback control unit. The control unit generates an indicating signal for a necessary steering wheel feedback torque. The system further includes a tactile feedback device which is connected to the control unit which receives the indicating signals for the necessary steering wheel feedback torque, the feedback device making a corresponding force available to the steering wheel.

It is considered a general disadvantage of the known motor vehicles with the hydraulic and electric power assisted steering systems or the steer-by-wire systems, that they are subject to specific service intervals and the abovementioned power steering systems may degrade in performance or at least be restricted in terms of their functionality, not only if the service intervals are not complied with. For this reason, it is appropriate to monitor this operator control unit, which is mentioned by way of example, so that a loss of performance can be communicated at an early point to the driver of the motor vehicle.

The communication is usually done in conventional motor vehicles by means of an audible display or visual display. However, in such motor vehicles the driver is confronted with an increasing number of audible and/or visual signals. This constitutes a heavy load of visual and/or audible messages, which distracts the attention of the driver from the traffic activity in order to perceive the respective display devices. In particular, the visual displays may be responsible for this, since they frequently lie outside the field of vision which is necessary to observe the road traffic.

For this reason a solution is desired based on the object of using simple means to improve a motor vehicle of the type mentioned at the beginning to the effect that the motor vehicle driver's attention is not disrupted if a warning signal is to be displayed to him.

SUMMARY OF THE INVENTION

In accordance with the teachings of the present invention, a system for a motor vehicle comprising at least one operator control unit of the motor vehicle having a fault-free functionality. The system includes a monitoring unit that monitors the fault-free functionality of the at least one operator control unit and generates signals. The monitoring unit generates tactile signals when limit-value functions of the at least one operator control unit occur so the status of the at least one operator control unit can be communicated haptically to a driver of the motor vehicle.

One object of the invention is achieved in that the monitoring unit generates tactile signals as warning signals so that a degradation of performance of the at least one operator control unit can be communicated haptically to a driver of the motor vehicle.

The solution according to the invention ensures that the driver of the motor vehicle is aware at an early time of a possible degraded performance of the at least one operator control unit, without the warning signals being overlooked and/or ignored. The tactile signaling preferably starts in noncritical driving situations for safety-monitoring functions, for example at a low speed of the motor vehicle and/or when the motor vehicle is driving straight ahead. Signaling in preferably noncritical driving situations means that the driver is not influenced or adversely affected by the tactile signaling in the driving situation.

In the sense of the invention it is advantageously provided that the monitoring unit makes a steering element, preferably a steering wheel of the motor vehicle, vibrate. The operator control unit may expediently be embodied as a steering device which has an electric actuator. The steering device may be provided, for example, with an electric power assisted steering system (EPAS) or else be embodied as a steer-by-wire system. These technologies advantageously have an actuator which permits the tactile feedback to be implemented. This tactile feedback is preferably implemented by vibrating the steering wheel, which informs the driver about an operating state or about the functionality of the at least one operator control unit.

It is expedient here that the monitoring unit monitors the functionality of the operator control unit. If the monitoring unit detects that the operator control unit has a loss of performance such that the operator control unit is at risk of being deactivated, the monitoring unit causes the steering wheel to vibrate, preferably to vibrate continuously, in order to inform the driver that the operator control unit or the system has to be serviced or repaired.

It is advantageous in certain circumstances that the basic functionality of the steering sensation and the steering power not to be influenced under normal operating conditions. The tactile signal preferably generates a vibration with specific amplitude and a defined frequency which is added to the normal functions and thus perceived haptically by the driver. In addition there is a provision for the driver not to be disrupted during his steering activities. The vibration can, for example, be generated if the vehicle is in a noncritical driving situation, for example after the engine is switched on, or at speed for driving in town and/or traveling straight ahead.

It is of course also possible for the vibration to be generated if limiting values at which the motor vehicle could exceed its physical limitations are reached, so that the driver is warned about this critical situation. These limiting values may be determined, for example, by an electronic stability program (ESP) or other components of a driving dynamics control system.

Overall, the invention advantageously makes available a motor vehicle which is improved with simple means to the effect that the attention of the motor vehicle's driver is not adversely affected if it is indicated to him that, for example, an operator control unit, for example the steering device, must be serviced and/or repaired. With customary, known warning systems it would be possible for the driver to ignore or overlook the generated visual and/or audible warning signals. In contrast, the tactile signal which is generated by the monitoring unit allows, for example, the steering wheel to vibrate so that possible servicing of the operator control unit is indicated continuously, in which case it is ensured that the warning signal or the hazard signal is not overlooked or ignored, since the driver always holds at least one hand on the steering wheel when the motor vehicle is moving. This is important in particular for driving safety because, if for example the at least one operator control unit, for example the steering device, is at risk of failing or is defective, this is communicated haptically to the driver by the vibrations of the steering wheel. It is favorable here if the tactile signal is present until the monitoring unit is reset, which can preferably be carried out by authorized specialist personnel if the degraded performance of the operator control unit is eliminated. Of course, the tactile signal may not only be present continuously at the steering wheel. It is also conceivable for the tactile signal to be present at the steering wheel in an alternating fashion at predefined time intervals. In addition, the monitoring unit may be integrated into a main control unit of the motor vehicle.

BRIEF DESCRIPTION OF THE DRAWINGS

Further advantageous refinements are disclosed in the subclaims and the following description of the figures, in which:

DETAILED DESCRIPTION OF THE PREFERRED EMBODIMENTS

Figure 1:
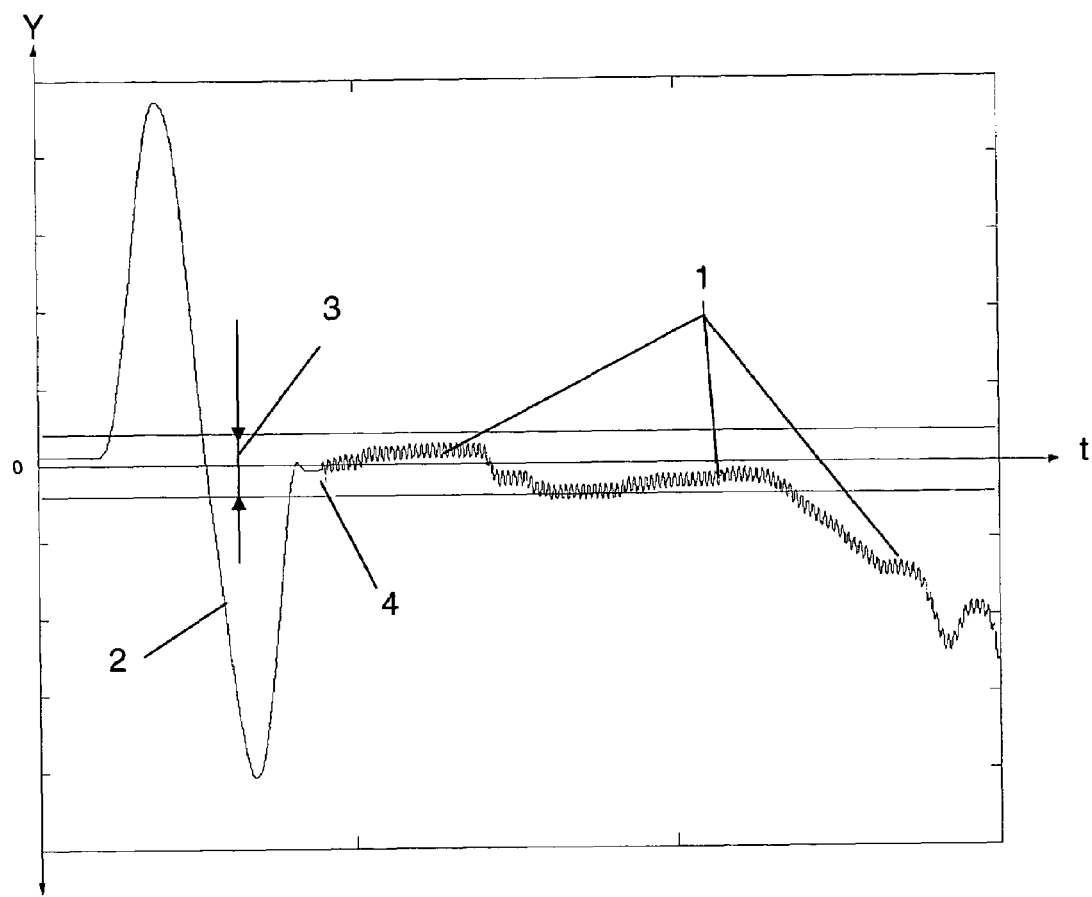
FIG. 1 shows a diagram of an operator control unit which is monitored by way of example.

FIG. 1 illustrates by way of example a monitored operator control unit. The operator control unit may be, for example, a steering device with a power assisted steering system. The power assisted steering system has, for example, an electric power assistance device, so that it is also possible to use the term electric power assisted steering systems (EPAS). However, the power assisted steering system can also be embodied according to the principle of the steer-by-wire system. FIG. 1 illustrates by way of example a steering wheel angle Y plotted against the time t.

A monitoring unit which monitors the functionality of the operator control unit or of the steering device of the motor vehicle and generates a warning signal 1 during limiting-value functions of the operator control unit or of the steering device is assigned to the operator control unit or steering device. The monitoring unit generates tactile signals as warning signals so that degraded performance of the at least one operator control unit or of the steering device can be communicated haptically to a driver of the motor vehicle. The tactile warning signal 1 is illustrated by a zigzag line in FIG. 1.

Degraded performance of the operator control unit or of the steering device may be present, for example, if a service interval has been exceeded without the operator control unit or the steering device having been serviced. Of course, it is also possible for any degraded performance of a mechanical and/or electrical nature to be present. If such an event occurs, the monitoring unit detects this, so that, for example, a steering element or steering wheel of the motor vehicle is made to vibrate. The vibrations may be present continuously at the steering wheel until the operator control unit has been serviced or repaired. In addition, the vibration may be applied to the steering wheel with a predefined intensity and frequency.

In the monitored operator control unit, a fault which is detected by the monitoring unit occurs and is represented in FIG. 1 by way of example by means of a deflection 2. However, the deflection 2 is detected when the motor vehicle is in a critical situation, so that the tactile warning signal 1 is initially not generated, in order to avoid adversely affecting the driver or surprising him with the vibration of the steering wheel. The tactile warning signal 1 is thus generated with somewhat of a time delay with respect to the actual detection of the degraded performance or the exceeding of the service interval.

The tactile signal 1 is generated at the point 4 only if the motor vehicle is in a range 3 of a noncritical driving situation. The range 3 of the noncritical driving situation can be preset in the monitoring unit using, for example, a specific vehicle criterion so that a noncritical driving state can be defined.

The tactile warning signal 1 is applied continuously in FIG. 1 so that it communicates a degradation of performance of the monitored operator control unit to the driver even in a possible critical driving situation. However, since the driver has already been able to prepare himself for the fact that such a degradation of performance is present, the surprise effect of the tactile warning signal 1 is lessened and no longer adversely affects the reactions of the driver. For this reason in FIG. 1 it is illustrated by way of example that the tactile warning signal 1 leaves the range 3 of the noncritical driving situation and nevertheless, for example, causes the steering wheel to vibrate. Of course, the tactile warning signal 1 can also be applied directly after the detection of the degraded performance or of the exceeded service interval.

Figure 2:
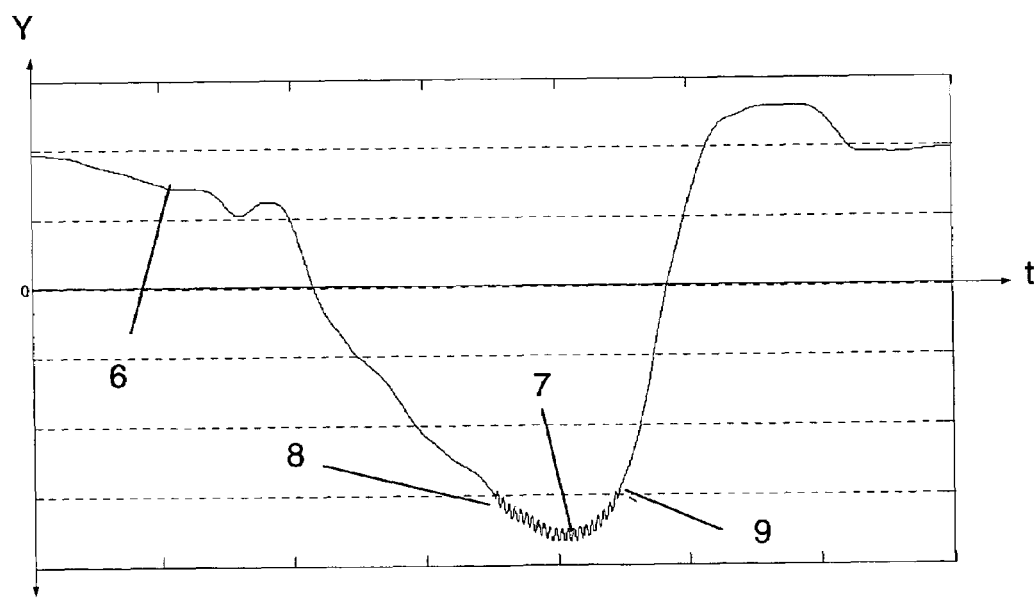
FIG. 2 shows a diagram of an exemplary vehicle stability criterion.

FIG. 2 illustrates, in one advantageous refinement of the invention, that a vibration is generated at the steering wheel if a vehicle stability criterion exceeds a critical value, for example owing to a steering wheel angle and the speed of the vehicle. It is particularly advantageous here that the vibration is merely superimposed on the steering activity without limiting or restricting the actual steering activity. The vibrations are illustrated in the steering curve 6 in each case as a zigzag region 7. The vibration informs the driver that a predetermined absolute steering wheel angle with respect to the instantaneously critical driving situation is reached, so that the driver can make the necessary counteraction early and can reduce the steering wheel angle.

According to FIG. 2, the tactile warning signal 1 is generated at a point 8 at which a critical value of a vehicle stability criterion is exceeded, with the tactile warning signal 1 being switched off when the critical region (point 9) is exited.

Of course, the invention is not restricted to the operator control unit or steering device which is disclosed by way of example. It is possible, for example for the monitoring unit to monitor all the operator control units of the motor vehicle, with the vibrations described above being generated at the steering wheel if degradations of performance occur. This ensures that the driver perceives a faulty function of the respective operator control unit at an early time without being able to overlook or ignore said faulty function. In addition, this reduces the number of audible indicator devices and/or visual display devices. This advantageously also ensures that the driver's attention is not restricted even when faulty functionalities of the respective operator control unit are displayed/indicated. Of course, the monitoring unit can also simultaneously monitor a plurality of operator control units. It would be appropriate here if in each case the monitoring unit generates vibrations different in terms of frequency and/or amplitude, which vibrations can be assigned to the respective operator control unit in order to ensure that the source of the fault is eliminated quickly. It is also conceivable, for example, if the functionality of electric systems of the motor vehicle such as, for example, a light system and/or indicator systems, for example brake lights and/or travel direction indicators (flashing indicator lights), is monitored.

The invention claimed is:

1. A system for a motor vehicle comprising:
   at least one operator control unit of the motor vehicle having a functionality that is free of a fault condition; and
   a monitoring unit monitors the fault-free functionality of the at least one operator control unit and generates signals to notify the operator of a need to service the control unit so that fault-free functionality is maintained;
   the monitoring unit generates tactile signals when limit-value functions of the at least one operator control unit occur so the status of the at least one operator control unit can be communicated haptically to a driver of the motor vehicle, the tactile signal is generated with a time offset such that the driver does not become aware of the haptic communication until the motor vehicle is in a non-critical driving situation as determined by an electronic stability program, the tactile signal is communicated continuously after the motor vehicle has reached the non-critical driving situation until a time in which the monitoring unit is reset.

2. The system according to claim 1, wherein one of the tactile signals is generated by the monitoring unit and causes a steering element of the motor vehicle to vibrate.

3. The system according to claim 1, wherein the operator control unit is a steering device which has an electric actuator.

4. The system according to claim 2 wherein the operator control unit is a steering device which has an electric actuator.

* * * * *